United States Patent [19]

Hirota et al.

[11] Patent Number: 4,762,057
[45] Date of Patent: Aug. 9, 1988

[54] AUTOMATIC BREAD PRODUCING MACHINE

[75] Inventors: Hiromi Hirota; Hirofumi Nakakura, both of Toyonaka; Haruo Ishikawa; Hajime Oyabu, both of Kawanishi; Akihisa Nakano, Toyonaka; Toshiichiro Tanaka, Hirakata, all of Japan

[73] Assignee: Matsushita Electric Industrial Co., Ltd., Kadoma, Japan

[21] Appl. No.: 917,368

[22] Filed: Oct. 9, 1986

[30] Foreign Application Priority Data

| Oct. 11, 1985 | [JP] | Japan | 60-227131 |
| Oct. 11, 1985 | [JP] | Japan | 60-227132 |
| Nov. 8, 1985 | [JP] | Japan | 60-251262 |
| Dec. 17, 1985 | [JP] | Japan | 60-283429 |

[51] Int. Cl.[4] ................ A21D 8/00; A47J 27/00
[52] U.S. Cl. .................... 99/348; 99/328; 99/329 R; 99/353; 99/468; 366/98; 366/146
[58] Field of Search ............ 99/328, 329 R, 331, 99/348, 467, 468, 352, 353, 483, 484, 486; 366/98, 69, 144–146, 96, 97; 426/504, 512

[56] References Cited

U.S. PATENT DOCUMENTS

| 4,202,258 | 5/1980 | Masuda et al. | 99/348 |
| 4,294,166 | 10/1981 | Takeuchi | 99/348 |
| 4,538,509 | 9/1985 | Ojima et al. | 366/98 X |

*Primary Examiner*—Timothy F. Simone
*Attorney, Agent, or Firm*—Wenderoth, Lind & Ponack

[57] ABSTRACT

A controlling apparatus controls a series of processes such as a kneading process, a fermenting process, a breathing process and a baking process of material within a bread baking mold based on the temperature of the bread baking mold detected within the baking chamber. The controlling apparatus controls a series of process of at least two types or more and is adapted to select either of the subsequent series of processes in accordance with one temperature input or two temperature inputs each respectively sensed at the kneading start time-point, during the kneading process, or at the kneading completion time-point. Fresh-baked bread which is superior may be provided independent from the changing influences of the seasons or of the material temperatures.

15 Claims, 6 Drawing Sheets

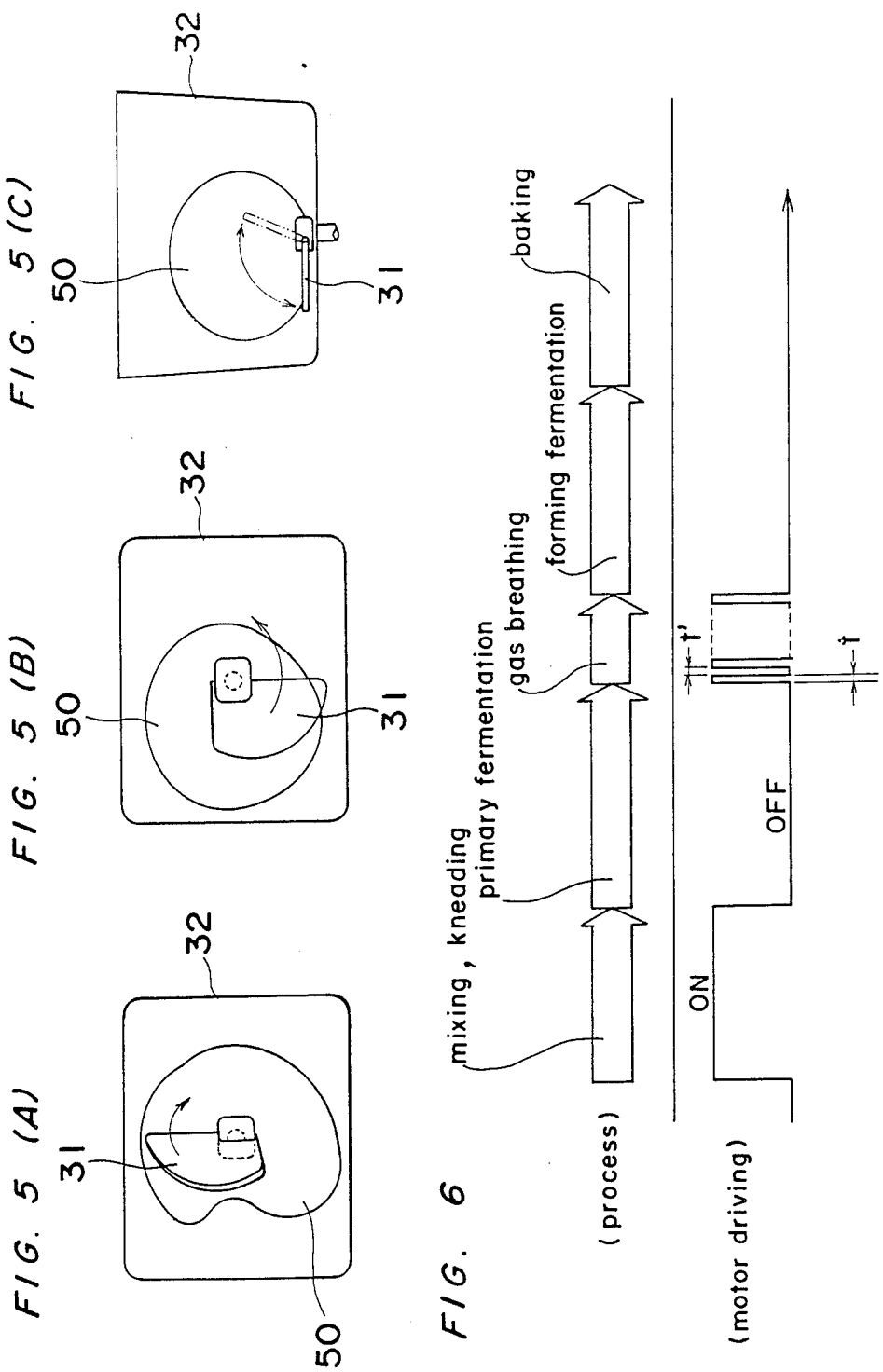

AUTOMATIC BREAD PRODUCING MACHINE

BACKGROUND OF THE INVENTION

1. Field of the Invention

The present invention generally relates to an automatic bread producing machine which performs a kneading process of the material, a fermenting process thereof, a breathing process thereof, and a baking process thereof automatically within a bread baking mold after only placing the material into a bread baking mold, so that fresh-baked bread may be produced at home.

2. Description of the Related Art

Generally, appliances such a as kneading machine, fermenting machine, push rod, oven and so on were used for baking bread at home. But it was extremely difficult to control the temperature and the time of baking. Considerable skill was required to produce delicious, fresh-baked bread in any season.

In order to overcome these problems, a bread producing machine capable of performing a kneading function, a fermenting function, an oven function and within a single product or a fully automatic bread producting machine which is capable of automatically baking the bread through setting of a timer have been considered. In the case of the former, a driving mechanism is provided within the oven having a heater, and a kneading container is placed within the oven. Then, kneading and fermenting operations on the material are performed, and thereafter the kneading container is removed to allow for breathing and forming. The container is again put into the oven to perform forming fermentation, bakaing operations. In the construction of the latter, a heating cell which is provided with the heater and adiabatic material is fixed. A bread baking mold with a kneading blade therein is disposed within the heating cell. The kneading blade is adapted to be driven by a belt and a pulley. Also, a timer and a temperature sensor are provided. In the above arrangement, the material is thrown into the bread baking mold. When the timer is set, the operation is started at a predetermined time. Each of the processes is automated by the timer and the temperature sensor to bake the bread. In such a conventional apparatus, in the case of the former, the kneading and the fermenting are automatically performed in accordance with the timer setting. After the completion of the fermentation, the mold is taken out of the oven. The breathing and forming operations are performed manually. Again, the mold is put into the oven to allow the forming fermentation to be performed. Thus, in order to eat the fresh-baked bread in the morning, one has to get up early in the morning to get ready and work.

Also, in the case of the latter, the bread is adapted to be baked automatically if the timer is set at a time appropriate for the material. The temperature within the bread mold is controlled to a proper given temperature through the control of the heater. The number of revolutions during the kneading and breathing operation is varied by the motor control. In this construction, the outer temperature changes with the ambient temperature, the revolution of the kneading blade is the same even when the material temperature, the water temperature have changed. As a result excessive kneading, fermentation of the raw material is caused due to high temperatures during the summer, while the insufficient kneading, fermentation of the raw material is caused due to low temperatures during the winter, because the ambient conditions change the produced condition of the bread, and thus good bread is not always baked.

SUMMARY OF THE INVENTION

Accordingly, an object of the present invention is to automatically bake bread which is normally good and delicious.

For the solution of the conventional problems, the present invention has a controlling apparatus which performs a series of processes such as a kneading process, a fermenting process, a breathing process and a baking process of the material within a bread baking mold according to temperature detection of the bread baking mold within the baking chamber. The controlling apparatus controls a series of processes of at least two types of more and is adapted to select either of the subsequent series of processes in accordance with one temperature information or two temperatures each of which is respectively sensed at the kneading start time-point, during the kneading process, or at the kneading completion time point.

This construction detects the bread raw material temperature through the bread baking mold if the ambient temperature changes to vary the characteristics of the material, water temperature so as to select the subsequent process to achieve the optimum bread producing process. Thus, the fresh-baked bread which is normally superior may be provided independently of the influences through the seasons or the material temperatures.

BRIEF DESCRIPTION OF THE DRAWINGS

These and other objects and features of the present invention will become apparent from the following description taken in conjunction with the preferred embodiment thereof with reference to the accompanying drawings, in which:

FIG. 5 shows schematic construction views for illustrating the operation of the kneading blade, (A) shows the operation during normal operation, (B) shows operation during reverse operation, (C) is a view illustrating the operation of (A) and (B);

FIG. 6 is a process diagram during the breathing process;

DETAILED DESCRIPTION OF THE INVENTION

Figure 1:
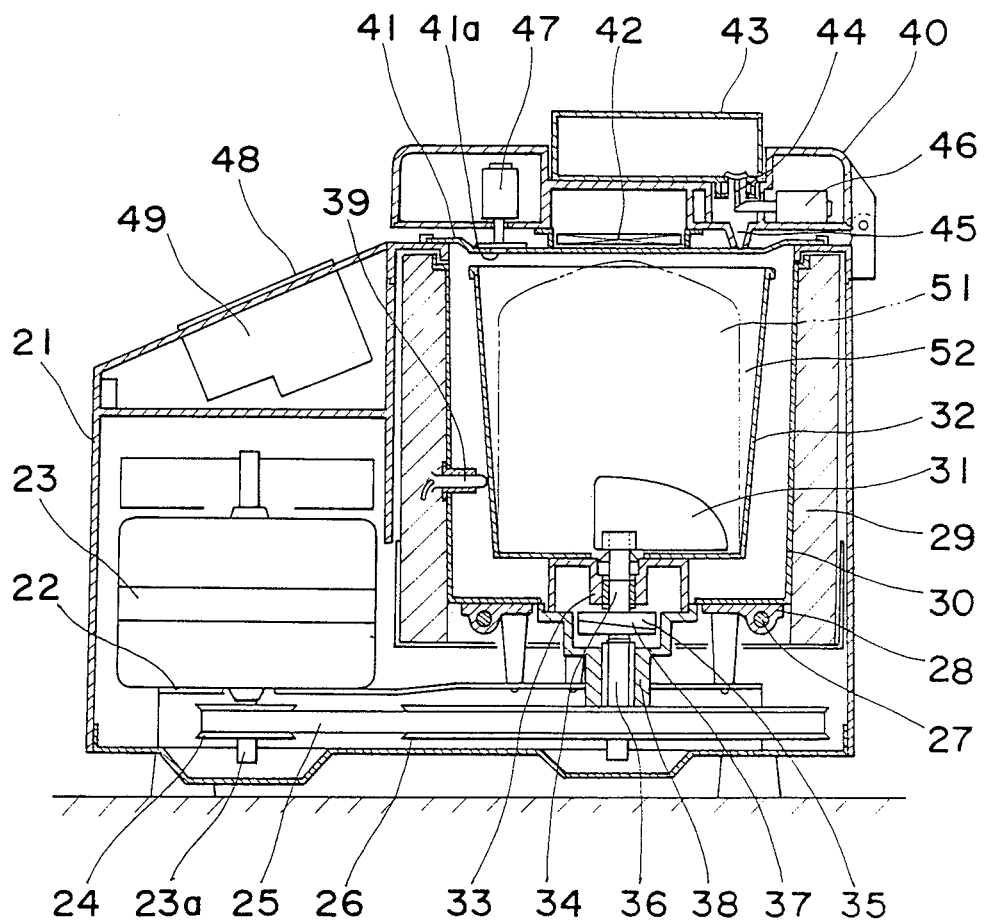
FIG. 1 is a cross-sectional view of an automatic bread producing machine in according to one embodiment of the present invention.

Before the description of the present invention proceeds, it is to be noted that like parts are designated by like reference numerals throughout the accompanying drawings.

Figure 2:
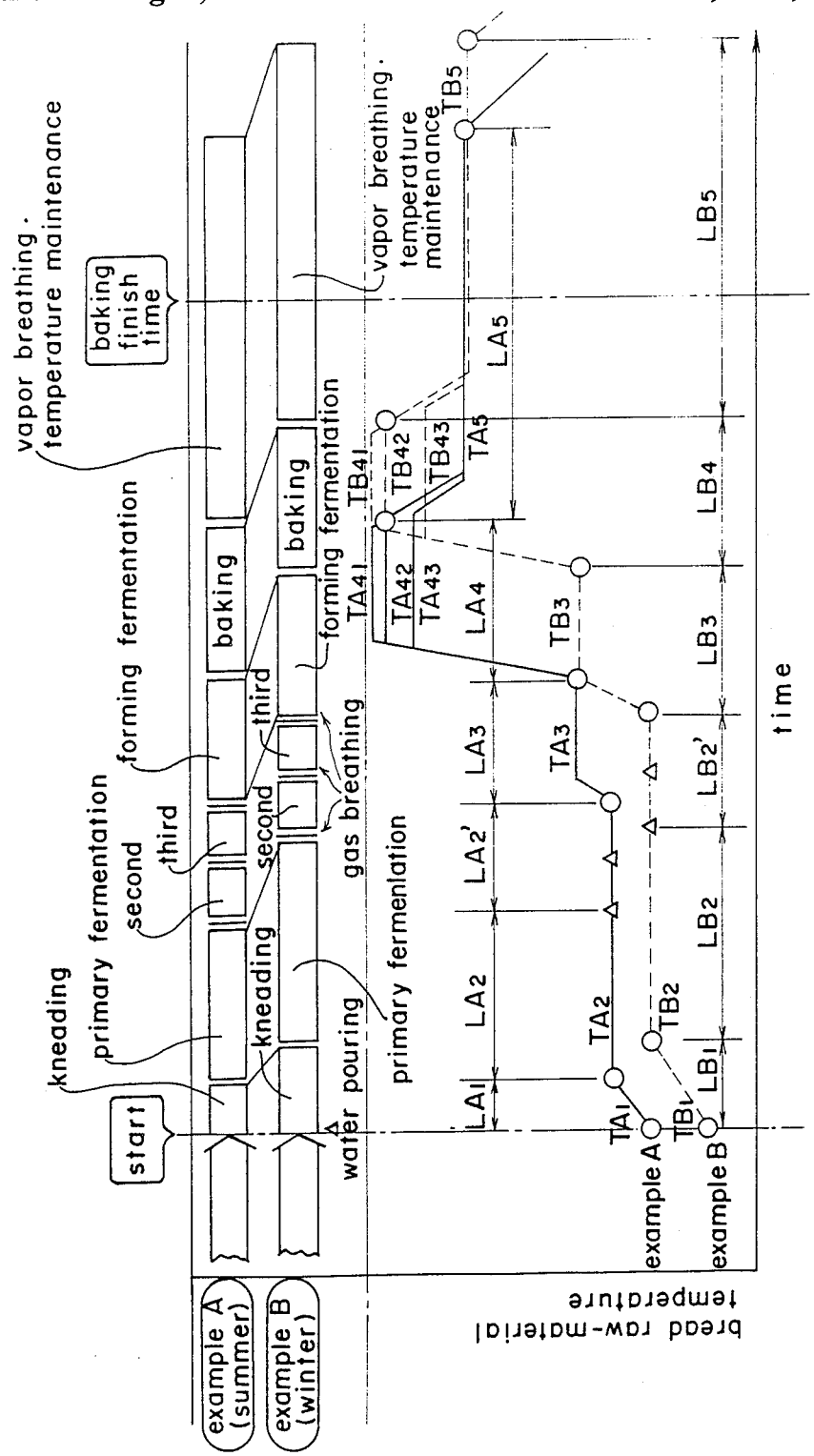
FIG. 2 is a program diagram showing one example of the bread producing process.

Referring now to the drawings, FIGS. 1 and 2 show a case 21 or the automatic bread producing machine, a chassis 22 disposed within the case 21, and a motor 23 secured to the chassis 22. A small pulley 24 is secured to the shaft 23a of the motor 23 so that power is transmitted to the large pulley 26 through the belt 25. Furthermore, the baking chamber 30 which has a lower heater-provided heater chassis 28 secured to the bottom face thereof and has adiabatic material 29 disposed on the periphery thereof is secured to the chassis 22. The heater 27 may have the shape of a ring extending in the inner space of the baking chamber 30. Within the baking chamber 30, a bread baking mold 32 has a kneading blade 31 detachably engaged with the bottom portion, a blade shaft 34 and, an upper connector 35 is supported through the shaft on a bread mold stand 33 secured to the bottom of the bread baking mold 32. In addition, the bread baking mold 32 is detachably engaged with a bread mold cradle 38 provided on the bottom portion of the baking chamber 30. The bread mold cradle 38 is secured to the chassis 22 and supports, through the shaft, the pulley shaft 36 having the large pulley 26 and the lower connector 37. Also, an elastically supported temperature detecting means 39 projects from the side face within the baking chamber 30 and is in pressure contact against the side face of the bread baking mold 32. In addition, the top face of the baking chamber 30 may be closed by a cover 40 which may be freely opened or closed and an inner cover 41 disposed on the lower face of the cover 40. An upper heater 42 contacting the top face is provided in the center of the cover 41, and the upper heater 42 is secured onto the lower face of the cover body 40. It is to be noted that only the lower heater 27 may be used without the upper heater 42. A water tank 43 is detachably provided on the cover 40. A solenoid 46 for water service is also provided to drip water from a water service opening 45 provided in the cover 40 by closing or opening a water service valve 44 of the water tank 43 so as to constitute water service means for the bread baking mold 32. Furthermore, a solenoid 47 for facilitating vapor breathing opens or closes a vapor breathing hole 41a provided in the cover 41 and is provided in the cover 40 to constitute a vapor breathing means for the bread baking mold 32. A switch panel 48 allows the baking finish time, baking color and so on to be input. A controlling apparatus 49 controls conditions of the motor 23, the lower heater 27, the upper heater 42, the solenoid 46 for water service, the solenoid 47 for vapor breathing in accordance with the information input through the switch panel 48 and temperature detection means 39 to perform a series of processes such as a kneading process, fermenting process, breathing process, baking process and so on of the material within the bread baking mold 32. The controlling apparatus 49 controls a series of processes of at least two types or more and is adapted to select either of the subsequent series of processes in accordance with one temperature or two temperatures respectively sensed at the kneading start timepoint, during the kneading process, or at the kneading completion time-point by the temperature detecting means 39.

One example of the controlling operation will be illustrated in FIG. 2. FIG. 2 shows the controlling condition at each bread raw-material temperature and time in the automatic bread producing machine. In this example, two types of series of processes are provided. An example A shows a condition where the ambient temperature is high in summer, while an example B shows a condition where the ambient temperature is low in winter. Also, TA1 through TA5 show the bread raw-material temperature in each process of example A, while LA1 through LA5 show the required time to perform each process of example A. The same thing can be said about example B.

First, in order to have the fresh-baked bread prepared by a given time, materials such as flour and so on are placed into the bread baking mold 32, the cover 40 is closed with the mold set within the baking chamber 30, a given amount of water is put into the water tank 43 engaged with the cover 40. the power supply is actuated the baking finish time is input through the switch panel 48, and the automatic operation begins at the given time by the timer operation.

During the starting operation, the kneading blade 31 is rotated through the upper and lower connectors 35 and 37 by the rotation of the motor 23 and, simultaneously, the solenoid 46 for water service operates so as to drip the water into the bread baking mold 32 from the water service opening 45 for the mixing and kneading operation of the materials such as flour and so on. When the ambient temperature and the temperatures of the material and water are high in the summer as shown in example A, the raw material temperature TA1 of the bread at the beginning of the kneading operation is high, while the raw material temperature TB1 is low in the winter. In order to detect the temperature, the temperature (one temperature or two temperatures each respectively detected at the kneading start time point, during the kneading process, or at the kneading completion time) at a given time point during the kneading process are sensed by a temperature detecting means 39 which is in pressure contact against the side wall of the bread baking mold 32. The controlling apparatus 49 sets the conditions of LA1 through LA5, TA2 through TA5, LB1 through LB5, TB2 through TB5 of the subsequent kneading time (LA1, LB1), the fermenting temperature (TA2, TB2), the fermenting time (LA2, LB2) and so on, and of the baking temperature (TA41 through TA43), (TB41 through TB43) based on the setting of the desired baking color (hardness of the bread outer skin) in accordance with this input information and the input information of the baking finish time. Each apparatus (heater, motor or the like) is adapted to be controlled so that these conditions are met. If excessive kneading is performed for a long time in a case where TA1 is high in the summer, the temperature of the bread raw material becomes excessively high and the elasticity in the bread raw material is removed, resulting in unraised bread being baked. Thus, the kneading time LA1 is made shorter than LB1 performed on low temperature raw bread material and, the temperature during the kneading time LA1, LB1 is varied as shown by TA1, TB1 so that superior bread is baked. Also, at the same time, when the temperature during winter is higher even during the fermenting time LA2, LB2, the degree of activity of the yeast is higher. When the fermenting time is long, fermentation becomes excessive, thus resulting in unraised bread being baked as when kneading. When the temperature in the winter or the like is lower, fermentation occurs slower. Accordingly, it is necessary to make the fermentation time longer. The time, the temperatures of the forming fermentation, baking and so on are set to optimum values by the detection of the bread raw material temperature during the kneading operation and based on the input information of the baking color (hardness of the bread outer skin), so that the superior bread may be normally baked. After completion of the baking at each process controlled in this manner, the solenoid 47 for vapor breathing use is operated to perform the vapor breathing operation via the steam breathing hole 41a to lower the temperature (TA5, TB5) to one at which the baked bread is to be immediately taken out and eaten and to maintain the temperature for a given time period (LA5, LB5). The baking finish time is controlled by the controlling apparatus 49 so that it may be set during the temperature retaining process. When the bread is taken out at the baking finish time point of the bread, the baking chamber 30, and the bread baking mold 32 are very hot so that the danger of burning is provided, the bread baked is too hot to eat, and the interior of the bread is too soft to cut. Accordingly, a state at which the bread is eaten deliciously by having a temperature which is sufficiently low so as to be free from the dangers is set as the finished bread baking time. Also, since bread is dried excessively hard by continuous temperature retention, the temperature is adapted to be maintained for a given time period. It is to be noted that the bread baking mold 32 is taken out of the baking chamber 30 (separation between the upper and lower connectors) so as to remove the bread from the opening portion of the bread baking mold 32.

Subsequently, description will be made with reference to the respective characteristic components.

Figure 3:
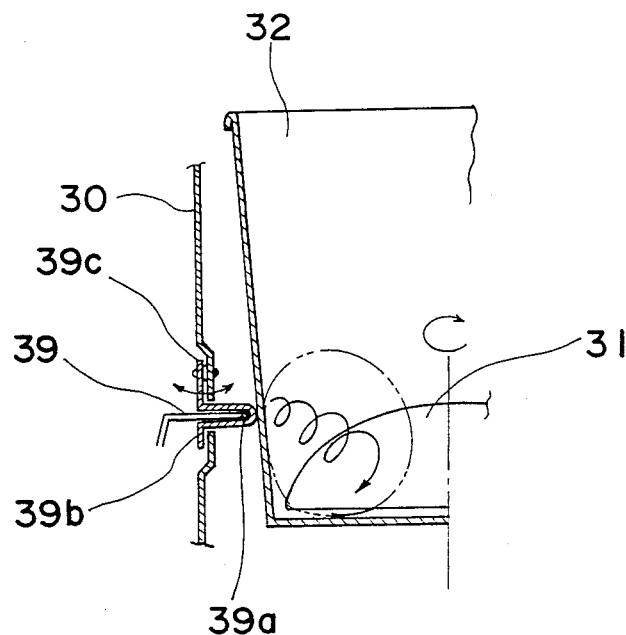
FIG. 3 is a partial sectional view showing the relationship between the temperature detecting means and the bread baking mold.

FIG. 3 shows the related construction between the temperature detecting means 39 and the bread baking chamber 32. The temperature detecting portion 39a of the temperature detecting means 39 is covered with a detection cover 39b made of elastic metal and is elastically supported in contact against the outer side of the bread baking mold 32. It is to be noted that the top end of the detection cover 39b is mounted on the baking chamber 30 by the support portion 39c. Also, the position of the temperature detecting portion 39a is set at almost the same level as the kneading blade 31 as is apparent from the drawing. The bread raw material comes into contact against it during the kneading operation or during the fermenting operation to allow for accurate measurement of the temperature of the bread raw material through the bread baking mold 32.

Figure 4:
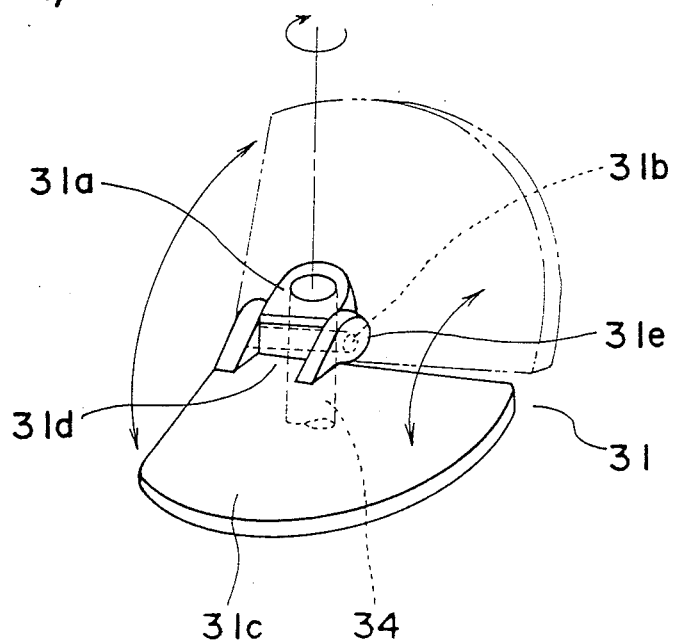
FIG. 4 is a perspective view showing the construction of the kneading blade.

FIG. 4 shows the construction of the kneading blade 31, which is composed of a boss portion 31a inserted into the blade shaft 34 and a blade portion 31c supported through the shaft 31b on the boss portion 31a. The blade portion 31c is adapted to rise and fall by the normal, reverse rotation of the blade shaft 34. During the upright rotation of the blade portion 31c, the upright condition is retained (shown in broken lines) with the holding-up portion 31d of the blade portion being held against the boss portion 31a. Also, as shown in the solid lines in the drawing during the flat fall rotation of the blade portion 31c occurs. The shaft 31b extends through the boss portion 31a almost normal to the rotating direction of the boss portion 31a and supports at its both ends the blade portion 31c. The shaft end is covered with the bearing portion 31e as shown.

When the blade 31 is normally rotated through the normal rotation of the motor 23 during the kneading process, the blade portion 31c of the kneading blade 31 rises by pivoting due to the resisting force of the bread raw material so as to knead the bread raw material between the bread baking mold 32 and the kneading blade 31. When the motor 23 is reversely rotated for facilitating the gas breathing process after the fermentation, the blade portion 31c of the kneading blade 31 falls to perform the gas breathing with weak resistance so as not to spoil the bread raw material. Also, the bread may be baked with the mark of the kneading blade 31 being hardly left behind when the bread is baked with keading blade in the fallen condition of the blade 31c. FIG. 5(A) shows a condition where the bread raw material 50 is kneaded, FIG. 5(B) shows a condition where the gas-breathing is performed by the reverse rotation, and FIG. 5(C) shows a rise and fall condition of the kneading blade 31 through the normal, reverse rotation.

Another gas-breathing method will be described with reference to FIG. 6. The motor 23 is continuously operated during the mixing and kneading operation for the powerful mixing and kneading of the raw material. The intermittent operation shown by the operation time t and the non-operation time t' is adapted to be repeated during the gas-breathing operation. The operation time t is set so that the rotation angle of the kneading blade 31 may become approximately one revolution or lower. The bread raw material is left as it is for a constant time and, at a constant temperature after the mixing and kneading operation and is fermented. The bread raw material is reasonably gasbreathed by the intermittent operation, without being cut or torn off in gluten film, by the intermittent operation. As a result, superior bread is produced. Also, in the continuous operation, the bread raw material is upwardly lifted by the kneading blade 31 and is mixed in a twisted form. But in the intermittent operation, it is upwardly lifted during the rotation, and is lowered during non-operation. The portion of the bread raw material which receives the force inparted by kneading blade 31 changes so that uniform gas-breathing may be performed on the whole.

In the intermittent operation, the normal rotation and the reverse rotation are optionally performed (for example, the normal operation is performed for a constant time period, and thereafter the reverse rotation is performed). The kneading blade 31 is raised as shown in FIG. 5(A) during the normal operation to facilitate the gasbreathing operation within the bread raw material. During the reverse operation, the kneading blade 31 falls flat as shown in FIG. 5(B). In the case of the flat fall, the bread raw material is adapted to roll on the kneading blade 31 so that the gas-breathing of the bread raw material surface may be performed.

Even in any one of the intermittent operation, the normal operation of the kneading blade 31 or the reverse operation in combination with the intermittent operation, the kneading blade 31 is in the flat condition at the completion of the gas breathing so that the mark of the kneading blade 31 may is not be left on the bread after the bread is baked.

Figure 7:
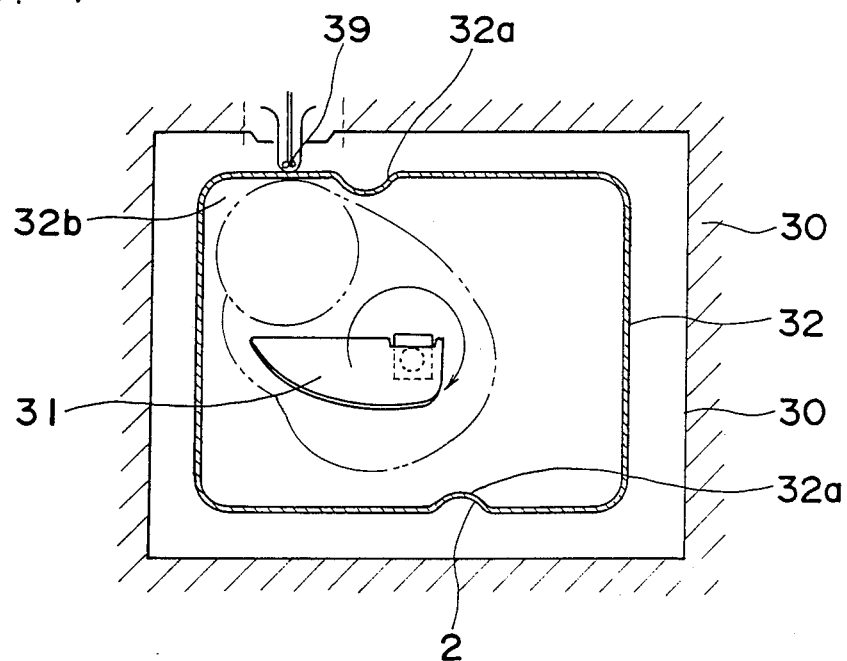
FIG. 7 is a cross-sectional view showing the relationship between the hub of the bread baking mold and the temperature detecting means.

As shown in FIG. 7, the bread baking mold 32 is rectangular. A rib 32a which projects inwardly and extends in an almost vertical direction is provided in the center of the inner wall or at a position located therefrom toward the side of the counter-rotation direction of the kneading blade 31. The bread raw material engages the rib 32a during the kneading step, and is kneaded by the kneading blade 31 with the bread raw material staying in the corner portion 32b of the bread baking mold 32, whereby superior bread raw material is provided. Also, the bread raw material is stopped immediately by the opposite rib 32a even if the raw material moves away from the rib 32a and is turned. Here it is kept kneading. Accordingly, the kneading is effectively performed, and the bread raw material turns together with the kneading blade 31. Sounds are not produced by the hitting of the bread raw material against the inner wall of the bread baking mold 32 because of the partial expansion through the centrifugal force. The position of the rib 32a is provided on the long inner-wall when the bread baking mold 32 is rectangular. As the distance with respect to the kneading blade 31 becomes wider on the short side, the effect is not considerable. Also, when it is provided in another location as in a case where the rib 32a is provided on the side of the counter-rotation direction of the kneading blade 31 from the center of the long side, the effect as a resistor is removed as the kneading blade 31 moves away from the inner wall. Also, when the rib is provided on a cylindrical kneading container, the rib is required to be larger to provide the effect. When the rib is too large, the problem of leaving marks on the bread is present. In the case of the rectangular shape, the bread raw material is forced into the corner portion 32b to provide a large effect of stopping the bread raw material even when the rib is small, thus preventing loud sounds during the kneading operation.

Figure 8:
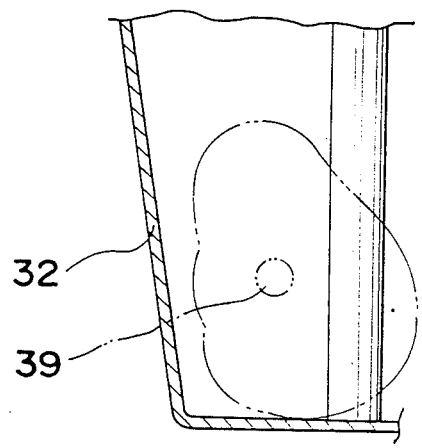
FIG. 8 is a partial sectional view showing the positional relationship of the essential portions of FIG. 7.

Also, a temperature detecting means 39 is provided on the outer wall of the bread baking mold 32 between the rib 32a and the corner portion 32b as shown in FIGS. 7 and 8 to correctly measure the temperature of the bread raw material being kneaded which stays therebetween. The kneading time and so on may be controlled in accordance with the correct information, thus resulting in more superior bread being baked.

As described hereinabove, the bread baking mold 32 is rectangular and has a rib 32a. As already apparent from the drawings, the mold has inclined sides so as to be spread in the bread draw-out direction, and has a wide opening in its upper portion. The gap 52 is provided, from the top end to the bottom and due to the taper which is provided in the bread draw-out direction, between the bread baking mold 32 and the outer skin of the bread 51 as shown in FIG. 1 when the vapor breathing hole 41a is opened for the bread vapor breathing operation. This is because the bread 51 is slightly contracted because of the baking and the vapor breathing. The gap 52 may be made large through the setting of the baking conditions. The vapor breathing operation may be effected not only from the top face of the bread 51, but also from the side face through the gap 52. When a six-face member is used, the moisture on the outer skin of the bread 51 is removed through the vapor breathing from five faces and as such, the collapse is hardly removed. Thus, bread may be produced which is hardly different from the manual vapor breathing operation. The effect is high if the taper of the side wall of the bread baking mold 32 is 2 degrees or more. But, if the taper exceeds 7 degrees, the bread 51 becomes out of shape. Therefore, the taper is desired to be between 2 degrees and 7 degrees. Also, after baking the bread 51 becomes mountain-shaped. Steam passes easier therethrough by the addition of the given material and the bread baking mold 32 in capacity. Any face, except for the bottom face, of the bread 51 becomes almost uniform in the vapor breathing operation. In addition, the bottom face is free from moisture through the vapor breathing operation from the other faces, and is hardly different from the other faces.

Figure 9:
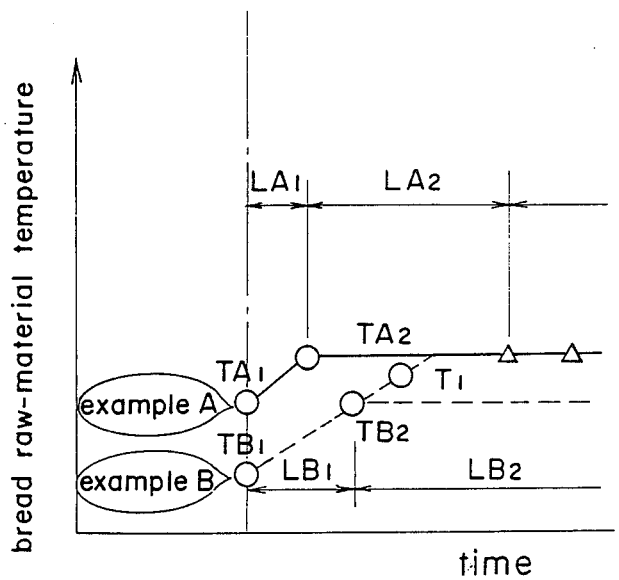
FIGS. 9(A) and 9(B) show program diagrams, each showing alternative embodiments.
Figure 9:
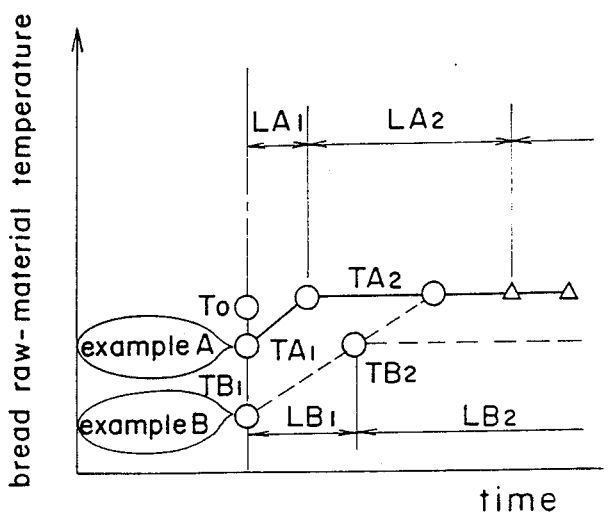

FIGS. 9(A) and 9(B) are respectively other program charts of bread baking according to the present invention, wherein materials such as flour or the like or the water cooled in a refrigerator are used. When materials such as flour and so on or water is properly cooled even in the summer, the temperature during the kneading time becomes as long as LB1 as in TB1 through TB2 in example B, but the temperature of the bread raw material may rise continuously, because the room temperature and the unit temperature are high thereafter. When the temperature of the bread raw material has reached the set temperature T1 between TA2 and TB2, the cooking operation is adapted to be effected as in the process of example A in which the fermentation time is short. Thus superior bread may be normally baked independently of the atmospheric temperature or the temperature of the material through such a process control as described hereinabove.

In the above-described example, the excessive fermentation is prevented when the cool water or the like is used in the summer by the temperature detection of the kneading process and the fermentation process. But, when the indoor temperature prior to the operation start is at the setting temperature T0 or more as sensed during respective temperature detection before the operation the kneading process start as in FIG. 9(B), it may be controlled to be moved to example A at the fermentation process or its subsequent process after the completion of the kneading operation even when the temperature of the kneading process has been raised as in example B by the use of the cold water or the like in the summer. Even in this case, the effect which is similar to one in the former case is provided.

Also, the temperature detection before the operation starts is performed to detect the room temperature. When higher cost devices are used, the other temperature detecting means for the room temperature detection, instead of the temperature detection of the before the operation start may be provided.

As is clear from the foregoing description, according to the automatic bread producing machine of the present invention, the material kneading process, the fermenting process, the gas-breathing process and the baking process may be performed automatically by only throwing the given material into the bread baking mold. The control most suitable for the bread production may be performed without being influenced by the ambient circumstances so that superior bread which is normally delicious may be provided at home.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An automatic bread producing machine for producing bread from raw bread material, said machine comprising:
   a casing;
   a baking chamber defined within said casing, a heater for heating the baking chamber to bake the raw bread material, and a cover for covering the baking chamber;
   a bread baking mold detachably securable to the casing within the baking chamber for receiving the raw bread material, the bread baking mold having a rotatable kneading blade disposed therein for kneading the raw bread material received in said mold;

a motor operatively connected to said kneading blade for driving said kneading blade to knead the raw bread material;

a temperature detecting means within said baking chamber for detecting the temperature of the raw bread material received in said bread baking mold; and a control apparatus operatively connected to said heater, said motor and said temperature detecting means for controlling the temperature in the baking chamber and the time during which a series of bread baking processes including the kneading of the raw bread material by the kneading blade driven by the motor, fermenting, gas breathing and the baking of the raw bread material by the heater are performed, said control apparatus comprising means for establishing at least two different modes of said series of processes, and means for selecting one of said modes in response to one or two temperatures of the bread raw material detected by said temperatures detecting means, each of said temperatures detected, respectively, at one of the start of the kneading of the raw bread material, at a time during the kneading of the raw bread material, and at the completion of the kneading of the raw bread material.

2. An automatic bread producing machine as claimed in claim 1, wherein said temperature detecting means includes a temperature detecting portion, and means for resiliently seating said temperature detecting portion against the outer surface of said bread baking mold when said mold is detachably secured within the baking chamber.

3. An automatic bread producing machine as claimed in claim 2, wherein said temperature detecting portion is disposed approximately level with the top of said kneading blade when the kneading blade kneads the raw bread material.

4. An automatic bread producing machine as claimed in claim 1, wherein said control apparatus is adjustable to adjust the baking time and baking temperature of the raw bread material for allowing the baking color of the bread baked from the raw bread material to be selected by a user of the machine.

5. An automatic bread producing machine as claimed in claim 1, and further comprising a vapor breathing means communicating with said baking chamber for allowing vapors during the fermentation of the raw bread material to vent from said chamber for facilitating said gas breathing process.

6. An automatic bread producing machine as claimed in claim 1, and further comprising a water service means for feeding water into said bread baking mold during the kneading of the raw bread material.

7. An automatic bread producing machine for producing bread from raw bread material, said machine comprising:

a casing;

a baking chamber defined within said casing, a heater for heating the baking chamber to bake the raw bread material, and a cover for covering the baking chamber;

a bread baking mold detachably securable to the casing within the baking chamber for receiving the raw bread material, the bread baking mold having a rotatable kneading blade disposed therein for kneading the raw bread material received in said mold, said kneading blade comprising a blade portion operatively connected to a shaft and movable relative thereto between a first position at which the blade portion lies generally flat on the bottom of said bread baking mold and a second position at which the blade portion is raised off of the bottom of said bread baking mold;

a motor operatively connected to said shaft for rotating the kneading blade in a normal rotational direction at which said kneading blade assumes said second position when kneading the raw bread material and a reverse rotational direction at which said kneading blade assumes said first position;

a temperature detecting means within said baking chamber for detecting the temperature of the raw bread material received in said bread baking mold; and a control apparatus operatively connected to said heater, said motor and said temperature detecting means for controlling the temperature in the baking chamber and the time during which a series of bread baking processes including the kneading of the raw bread material by the kneading blade driven by the motor, fermenting, gas breathing and the baking of the raw bread material by the heater are performed.

8. An automatic bread producing machine as claimed in claim 7, wherein said control apparatus controls said motor to rotate said shaft in said reverse rotational direction during said gas breathing process.

9. An automatic bread producing machine for producing bread from raw bread material, said machine comprising:

a casing;

a baking chamber defined within said casing, a heater for heating the baking chamber to bake the raw bread material, and a cover for covering the baking chamber;

a bread baking mold detachably securable to the machine within the bread baking chamber for receiving the raw bread material, said mold having a bottom, an open top portion that is wider than said bottom, sides extending upwardly and outwardly from said bottom to said top portion so as to be inclined relative to a direction in which the baked bread is drawn out from the mold, and a rotatable kneading blade disposed therein at said bottom for kneading the raw bread material received in the mold;

a temperature detecting means within said baking chamber for detecting the temperature of the raw bread material received in said bread baking mold; and a control apparatus operatively connected to said heater, said motor and said temperature detecting means for controlling the temperature in the baking chamber and the time during which a series of bread baking processes including the kneading of the raw bread material by the kneading blade driven by the motor, fermenting, gas breathing and the baking of the raw bread material by the heater are performed.

10. An automatic bread producing machine for producing bread from raw bread material, said machine comprising:

a casing;

a baking chamber defined within said casing, a heater for heating the baking chamber to bake the raw bread material, and a cover for covering the baking chamber;

a bread baking mold detachably securable to the casing within the baking chamber for receiving the raw bread material, the bread baking mold having a rotatable kneading blade disposed therein for kneading the raw bread material received in said mold;

a motor operatively connected to said kneading blade for driving said kneading blade to knead the raw bread material;

a temperature detecting means within said baking chamber for detecting the temperature of the raw bread material received in said bread baking mold; and a control apparatus operatively connected to said heater, said motor and said temperature detecting means for controlling the temperature in the baking chamber and the time during which a series of bread baking processes including the kneading of the raw bread material by the kneading blade driven by the motor, fermenting, gas breathing and the baking of the raw bread material by the heater are performed, and said control apparatus for controlling said motor to drive said kneading blade intermittently during the gas breathing process.

11. An automatic bread producing machine as claimed in claim 10, wherein said kneading blade comprises a blade portion movable between a first position at which said portion lies generally flat on the bottom of said bread baking mold and a second position at which said portion extends upwardly from the bottom of said bread baking mold when the kneading blade is driven by said motor, said blade portion assuming said first position when the gas breathing process is completed.

12. An automatic bread producing machine for producing bread from raw bread material, said machine comprising:

a casing;

a baking chamber defined within said casing, a heater for heating the baking chamber to bake the raw bread material, and a cover for covering the baking chamber;

a bread baking mold detachably securable to the casing within the baking chamber for receiving the raw bread material, the bread baking mold having a rotatable kneading blade disposed therein for kneading the raw bread material received in said mold, said kneading blade comprising a boss portion secured to a rotary blade shaft, a blade portion, and a second shaft extending through said boss portion in a direction generally normal to the direction in which the blade shaft extends and connected to said blade portion for pivotally mounting said blade portion to said boss portion;

a motor operatively connected to said kneading blade for driving said kneading blade to knead the raw bread material;

a temperature detecting means within said baking chamber for detecting the temperature of the raw bread material received in said bread baking mold; and a control apparatus operatively connected to said heater, said motor and said temperature detecting means for controlling the temperature in the baking chamber and the time during which a series of bread baking processes including the kneading of the raw bread material by the kneading blade driven by the motor, fermenting, gas breathing and the baking of the raw bread material by the heater are performed.

13. An automatic bread producing machine for producing bread from raw bread material, said machine comprising:

a casing;

a baking chamber defined within said casing, a heater for heating the baking chamber to bake the raw bread material, and a cover for covering the baking chamber;

a bread baking mold detachably securable to the casing within the bread baking chamber for receiving the raw bread material, said bread baking mold having a kneading blade disposed therein that is rotatable in a rotational direction for kneading the raw bread material received in the mold, a top, a bottom, four sides collectively yielding a generally rectangular longitudinal cross-sectional configuration to the mold, and a rib projecting inwardly from one of said sides and extending in a generally vertical direction from the top to the bottom of the mold, said rib disposed in one of a first position and a second position, said first position being located at the approximate center of said one of said sides, said second position being located away from the center of said one of said sides in a direction opposite to said rotational direction;

a motor operatively connected to said kneading blade for driving said kneading blade to knead the raw bread material;

a temperature detecting means within said baking chamber for detecting the temperature of the raw bread material received in said bread baking mold; and a control apparatus operatively connected to said heater, said motor and said temperature detecting means for controlling the temperature in the baking chamber and the time during which a series of bread baking processes including the kneading of the raw bread material by the kneading blade driven by the motor, gas breathing and the baking of the raw bread material by the heater are performed.

14. An automatic bread producing machine as claimed in claim 13, wherein said temperature detecting means contacts the outer surface of said bread baking mold at a position located between said rib and a corner portion defined between said one of said sides and another of said sides of said bread baking mold.

15. An automatic bread producing machine for producing bread from raw bread material, said machine comprising:

a casing;

a baking chamber defined within said casing, a heater for heating the baking chamber to bake the raw bread material, and a cover for covering the baking chamber;

a bread baking mold detachably securable to the casing within the baking chamber for receiving the raw bread material, the bread baking mold having a rotatable kneading blade disposed therein for kneading the raw bread material receive in said mold;

a motor operatively connected to said kneading blade for driving said kneading blade to knead the raw bread material;

a temperature detecting means within said baking chamber for detecting the temperature of the raw bread material received in said bread baking mold; and a control apparatus operatively connected to said heater, said motor and said temperature detecting means for controlling the temperature in the baking chamber and the time during which a series of bread baking processes including the kneading of the raw bread material by the kneading blade driven by the motor, fermenting, gas breathing and the baking of the raw bread material by the heater are performed, said control apparatus comprising means for establishing at least two modes of said series of processes, and means for selecting one of said modes in response to two temperatures of the raw bread material collectively detected at one of two sets of times, one of said sets consisting of a time before the kneading of the raw bread material and a time during the kneading of the raw bread material and the other of said sets consisting of a time during the kneading the raw bread material and a time during the fermenting process.

* * * * *